I. B. WULKAN.
LOOM FASTENER.
APPLICATION FILED NOV. 1, 1917.

1,295,249.

Patented Feb. 25, 1919.

INVENTOR
Isaac B. Wulkan.
By Fay, Oberlin + Fay
ATTORNEYS.

UNITED STATES PATENT OFFICE.

ISAAC B. WULKAN, OF CLEVELAND, OHIO.

LOOM-FASTENER.

1,295,249.

Specification of Letters Patent.

Patented Feb. 25, 1919.

Application filed November 1, 1917. Serial No. 199,638.

*To all whom it may concern:*

Be it known that I, ISAAC B. WULKAN, a citizen of the United States, and a resident of Cleveland, county of Cuyahoga, and State of Ohio, have invented a new and useful Improvement in Loom-Fasteners, of which the following is a specification, the principle of the invention being herein explained and the best mode in which I have contemplated applying that principle, so as to distinguish it from other inventions.

The present invention relates to a device for securing flexible tubing or lighting cables in an outlet or switch box. It has been designed to hold the tubing or usual covered cable securely in position within the box and prevent any pulling or twisting strains to which the cable may be subjected, from reaching the points where the cable is attached to the switch contacts, or where two or more cables are spliced together. The device is also adapted to be easily released if, for any reason, it is found desirable to remove the cables from the box or to remove the box from the wall. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—

Figure 1:
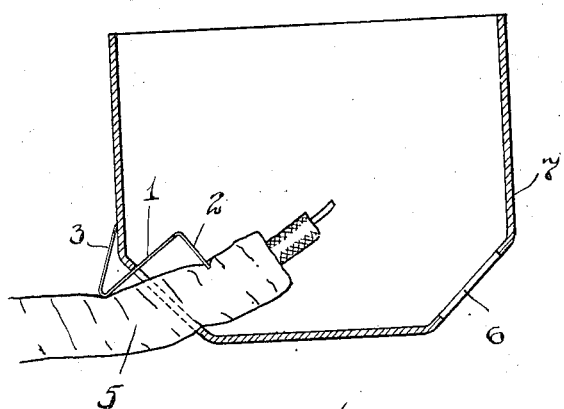
Figure 2:
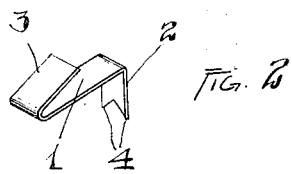

Figure 1 is a sectional view through an outlet box showing my fastener in place: Fig. 2 is a perspective view of my fastener; and Fig. 3 is a view similar to Fig. 1, but showing my fastener applied in a different manner.

The device consists essentially of a piece of flat spring metal 1, which is bent as best illustrated in Fig. 2 of the drawing. One end is bent downwardly at substantially a right angle to form an arm 2 which has a V-shaped notch in the end thereof to form sharp points 4 which will engage the flexible tubing or covered wire 5. The other end of the flat spring is bent upwardly to form an arm 3, making an acute angle with the body of the spring, and this end is adapted to contact with the metal frame work of the box.

Figure 3:
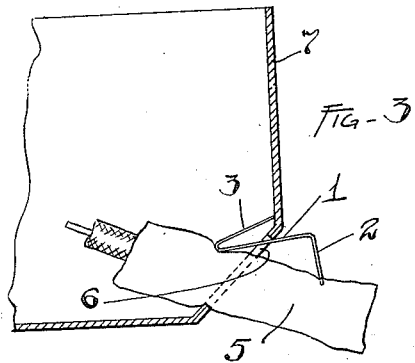

In use, the fastener may be inserted in two ways, as shown in Figs. 1 and 3. In Fig. 1, the fastener will be inserted through the opening 6 in the outlet box 7, and when the wire or tubing has been correctly positioned, the points will be forced into the covering of the wire, as illustrated in Fig. 1. When correctly placed in this position, the body of the spring contacts with the edge of the opening in the box 7 and the upwardly extending arm 3 contacts with the outside of the switch box. The cable 5 will thus be held securely in place, for any strains which will tend to pull the cable out of the box will be overcome by the pressure of the spring against the edge of the aperture through which it passes. If the strain of the cable increases, it merely forces the points down deeper into the cable, and thus prevents the covering from tearing.

The fastener may be turned around and used as is shown in Fig. 3 when the points 4 will be in engagement with the cable on the outside of the box 7, and the other arm 3 will contact the inside of the box above the aperture. Movement of the cable away from the box pulls the arm tight against the inside of the box, thus preventing the cable from moving. The cable cannot be moved inwardly as in this case the body of the spring contacts the edge of the aperture and drives the points of the downwardly extending arm more firmly into the covering of the cable.

The present fastening device thus securely fastens the cables or wires in the desired position, yet if the points are well drawn from the covering material, it is easy to remove the cable, as it slides easily past the rounded portion of the spring where the arm 3 starts.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination with a box having an opening therethrough for receiving flexible tubing, of a fastening consisting of two portions at an angle to each other, one such portion being adapted to engage such tubing and the other portion being adapted to extend through such opening in said box and to wedge against the side of such opening to prevent movement of the fastener and tubing.

2. In a device of the character described, the combination with a box having an opening therethrough for receiving flexible tubing, of a fastener consisting of two angularly related legs, each adapted to engage the tubing, one of said legs extending through the opening in said box and being adapted to wedge against the side of such opening to prevent movement in one direction, and means on said leg to engage said box and prevent movement of the fastener and tubing in the other direction.

3. In a device of the character described, the combination with a box having an opening therethrough for receiving flexible tubing, of a fastener consisting of a body portion having a leg extending at right angles thereto and provided with a notched end to engage the tubing, the body portion being adapted to extend through such opening, and means on such body portion adapted to engage with the sides of such opening and box to prevent movement of the fastener and tubing in either direction.

4. In a device of the character described, the combination with a box having an opening therethrough for receiving flexible tubing, of a fastener consisting of a body portion having a leg extending at right angles thereto and provided with a notched end to engage the tubing, the body portion being adapted to extend through such opening and to wedge against the ends thereof and prevent movement of the fastener in one direction, and a projection on said body portion adapted to engage with the side of said box to prevent movement of the fastener in the other direction.

5. In a device of the character described, the combination with a box having an opening therethrough for receiving flexible tubing, of a fastener consisting of a body portion having a leg extending at right angles thereto and provided with a notched end to engage the tubing, the body portion being adapted to extend through such opening and to wedge against the ends thereof and prevent movement of the fastener in one direction and a second leg extending at an acute angle to said body portion and on the opposite side from said first leg, said second leg being adapted to engage with the side of said box to prevent movement of the fastener in the other direction.

Signed by me this 29th day of October, 1917.

ISAAC B. WULKAN.